United States Patent
Reinhart et al.

(10) Patent No.: US 9,850,991 B2
(45) Date of Patent: Dec. 26, 2017

(54) METHOD OF INSTALLING CHAIN DRIVEN POWER TAKE OFF

(71) Applicant: GM Global Technology Operations LLC, Detroit, MI (US)

(72) Inventors: Timothy J. Reinhart, Lake Orion, MI (US); Addison T. Solak, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 14/814,859

(22) Filed: Jul. 31, 2015

(65) Prior Publication Data

US 2017/0030435 A1 Feb. 2, 2017

(51) Int. Cl.
| | |
|---|---|
| *F16H 7/24* | (2006.01) |
| *F16H 7/06* | (2006.01) |
| *B25B 27/22* | (2006.01) |
| *B25B 27/00* | (2006.01) |
| *B25B 9/00* | (2006.01) |
| *B25B 11/00* | (2006.01) |

(52) U.S. Cl.
CPC ............ *F16H 7/24* (2013.01); *B25B 9/00* (2013.01); *B25B 11/00* (2013.01); *B25B 27/0035* (2013.01); *B25B 27/22* (2013.01); *F16H 7/06* (2013.01); *Y10T 29/49464* (2015.01); *Y10T 29/49465* (2015.01); *Y10T 29/53978* (2015.01)

(58) Field of Classification Search
CPC .......... B60K 17/00; B60K 17/28; B25B 9/00; B25B 9/02; B25B 11/00; B25B 11/02; B25B 27/0035; B25B 27/0064; B25B 27/22; F16H 7/06; F16H 7/18; F16H 7/20; F16H 7/22; F16H 7/24; F16H 2007/185; Y10T 29/49464; Y10T 29/49465; Y10T 29/537; Y10T 29/53909; Y10T 29/53926; Y10T 29/53978
See application file for complete search history.

(56) References Cited

U.S. PATENT DOCUMENTS

| | | | | |
|---|---|---|---|---|
| 1,645,669 | A * | 10/1927 | Stevenson | ............ B25B 11/02 269/156 |
| 5,197,176 | A * | 3/1993 | Reese | ............ B25B 33/00 29/270 |
| 6,584,663 | B1 * | 7/2003 | Woodard | ............ B25B 27/0064 29/271 |
| 2002/0092385 | A1 * | 7/2002 | Belcher | ............ B25B 13/48 81/176.1 |

(Continued)

*Primary Examiner* — Christopher M Koehler

(57) ABSTRACT

Assembly tools or aides assist the installation of chains and sprockets for a power take off in a motor vehicle automatic transmission. A first tool is an assembly clip having a semi-circular channel that engages the periphery of a chain disposed about a socket. The clip facilitates installation of the chain and a first sprocket through a slot or other opening in the side of a transmission housing while a second sprocket is being secured to a transmission shaft and the chain is engaged thereabout. The clip also facilitates positioning of the first sprocket in a desired location, typically on a driven shaft while retaining the chain thereabout. A second tool includes a pair of elongate, parallel pins which cooperate with the clip and the first sprocket to hold it in place during assembly of certain components of the transmission such as a power take off shaft or bulkhead.

12 Claims, 6 Drawing Sheets

(56) References Cited

U.S. PATENT DOCUMENTS

| | | | |
|---|---|---|---|
| 2003/0084557 A1* | 5/2003 | Whitehead | B25B 27/0035 29/281.5 |
| 2006/0064862 A1* | 3/2006 | Mitchell | B25B 27/0035 29/281.5 |
| 2010/0125996 A1* | 5/2010 | Coffman, Jr. | B25C 3/008 29/283 |
| 2014/0201962 A1* | 7/2014 | Heath | B25B 11/02 29/283 |

* cited by examiner

METHOD OF INSTALLING CHAIN DRIVEN POWER TAKE OFF

FIELD

The present disclosure relates to the installation of a chain driven power takeoff in an automatic transmission and more particularly to assembly aides and methods of utilizing such assembly aides to install a chain and chain sprockets for a power takeoff in an automatic transmission.

BACKGROUND

The statements in this section merely provide background information related to the present disclosure and may or may not constitute prior art.

A pair of chain sprockets and an encircling chain are often utilized in power equipment to transfer torque from one axis of rotation to a parallel axis of rotation, with or without a change in speed ratio. Such an arrangement is frequently utilized in motor vehicle powertrains to transfer torque from the main axis of the transmission (and input and output shafts) to an axis offset therefrom but parallel to drive a transfer case or power takeoff (PTO).

Because of the inherent two axis flexibility of chains as well as the common requirement of having the chain engaged by one or both sprockets as they are installed on shafts, these components are often difficult to install in confined spaces which are frequently encountered in power transmission equipment. This difficulty is exacerbated when the chain and at least one sprocket must be installed through a slot or other small opening in the housing of the equipment which is often the case with motor vehicle transmissions.

The present invention is directed to providing assembly tools or aides which assist the installation of chains and sprockets to provide torque to a power take off in a motor vehicle automatic transmission.

SUMMARY

The present invention provides assembly tools or aides which assist the installation of chains and sprockets to provide torque to a power take off in a motor vehicle automatic transmission. A first tool is an assembly clip having a semi-circular channel that engages the periphery of a chain disposed about a socket. The clip facilitates installation of the chain and a first sprocket through a slot or other small opening in the side of a transmission housing while a second sprocket is being secured to a transmission shaft and the chain is engaged thereabout. The clip also facilitates positioning of the first sprocket in a desired location, typically aligned with a driven shaft while retaining the chain thereabout. A second tool includes a pair of elongate, parallel pins which cooperate with the clip and the first sprocket to hold it in place during assembly of certain components of the transmission such as a power take off shaft or bulkhead which isolates and protects the chain and drive sprockets.

Thus it is an aspect of the present invention to provide assembly tools which facilitate installation of chain sprockets and chains in motor vehicle automatic transmissions.

It is a further aspect of the present invention to provide assembly tools which facilitate installation of chain sprockets and chains for a power takeoff in motor vehicle automatic transmissions.

It is a still further aspect of the present invention to provide an assembly clip which engages a chain and chain sprocket to facilitate installation of chain sprockets and chains in motor vehicle automatic transmissions.

It is a still further aspect of the present invention to provide a pin tool which cooperates with the assembly clip to facilitate installation of chain sprockets and chains in motor vehicle automatic transmissions.

It is a still further aspect of the present invention to provide an assembly clip which engages a chain and chain sprocket to facilitate installation of chain sprockets and chains for a power takeoff in motor vehicle automatic transmissions.

It is a still further aspect of the present invention to provide a pin tool which cooperates with the assembly clip to facilitate installation of chain sprockets and chains for a power takeoff in motor vehicle automatic transmissions.

It is a still further aspect of the present invention to provide a method of assembling chain sprockets and a chain into a motor vehicle automatic transmission utilizing a cooperating assembly clip and pin tool.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 9:
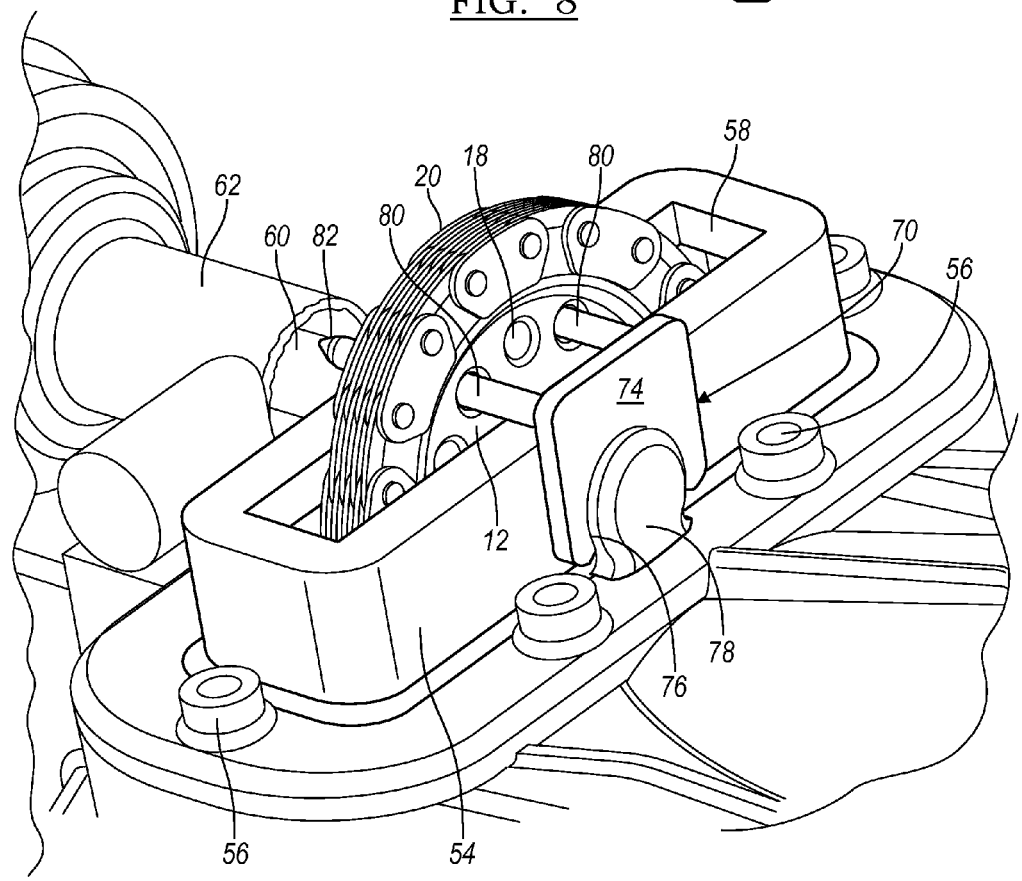
Figure 10:
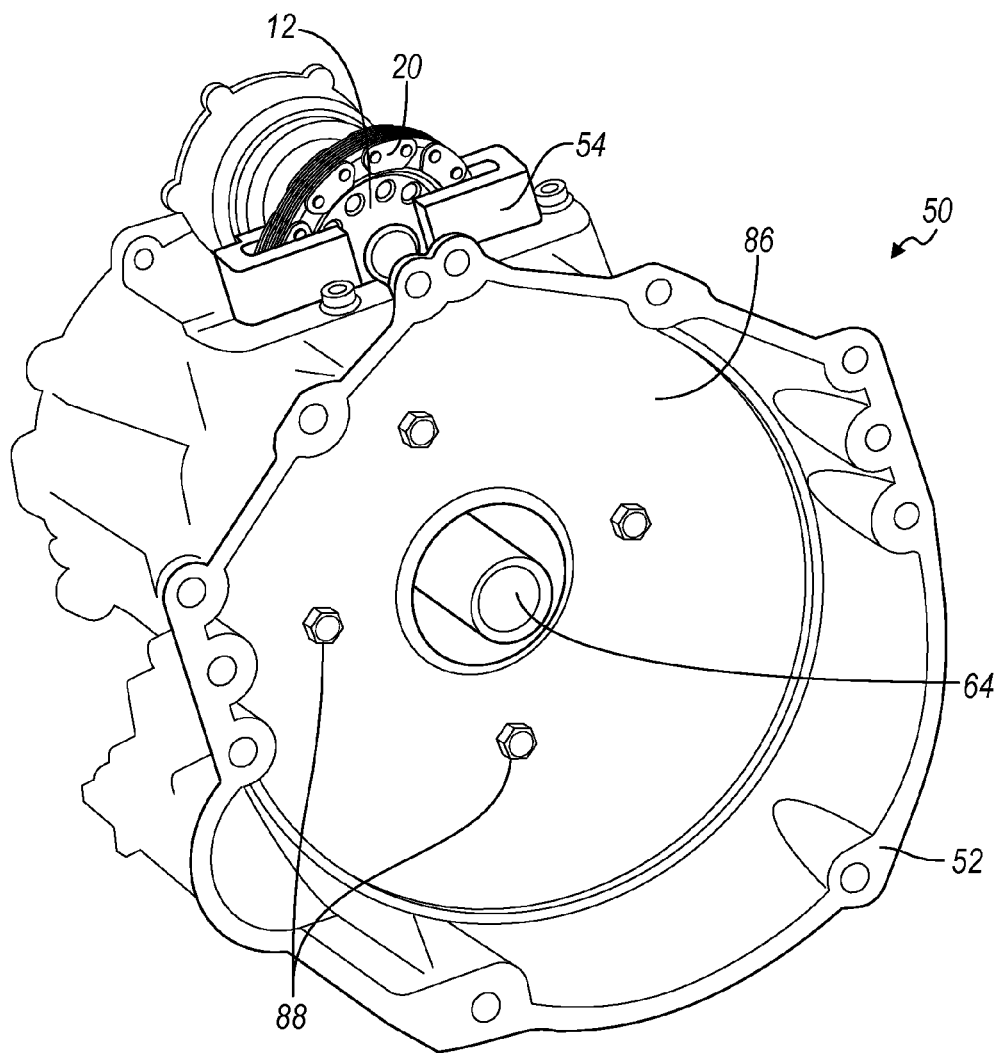

FIG. 9 is a perspective view of the exterior of a motor vehicle automatic transmission illustrating one chain sprocket retained by the pin tool or holder in a power take off collar according to the present invention with the assembly clip removed; and FIG. 10 is a perspective end view of a motor vehicle automatic transmission with the chain and sprockets installed and a front cover bolted to the transmission.

DETAILED DESCRIPTION

The following description is merely exemplary in nature and is not intended to limit the present disclosure, application, or uses.

Figure 1:
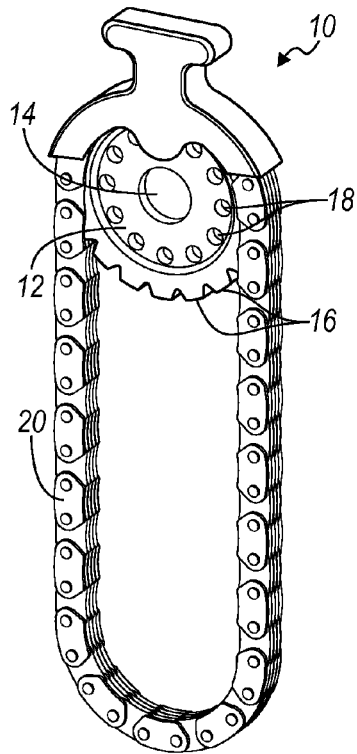
FIG. 1 is a perspective view of an assembly clip according to the present invention in place on a chain sprocket and chain assembly.

With reference to FIG. 1, an assembly aide or clip 10 is illustrated in place on a first chain sprocket 12 having a center opening 14, a plurality of chain teeth 16 about its periphery and a plurality of through apertures or openings 18 disposed radially between the center opening 14 and the periphery of the chain sprocket 12. The assembly aide or clip 10 also receives a multi-link chain 20 which is disposed on the first chain sprocket 12.

Figure 2:
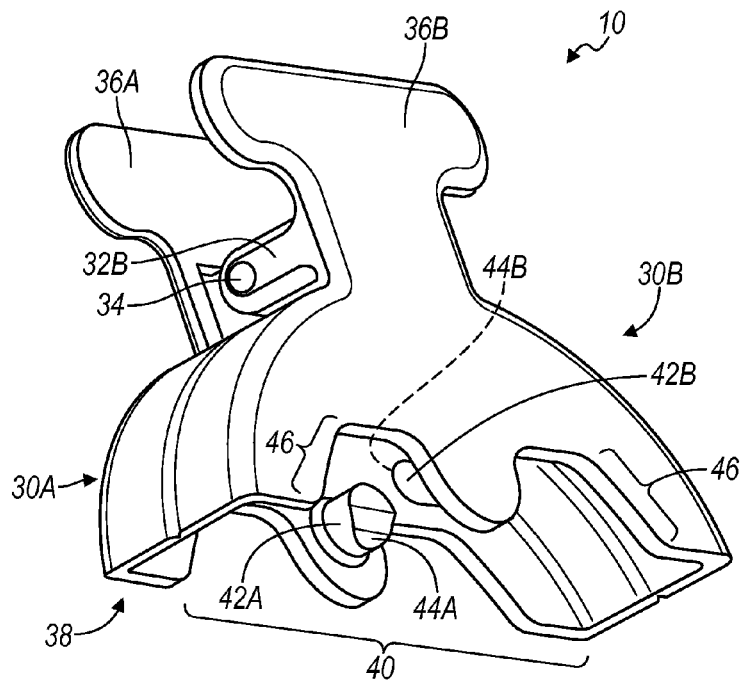
FIG. 2 is a perspective view of an assembly clip according to the present invention.
Figure 3:
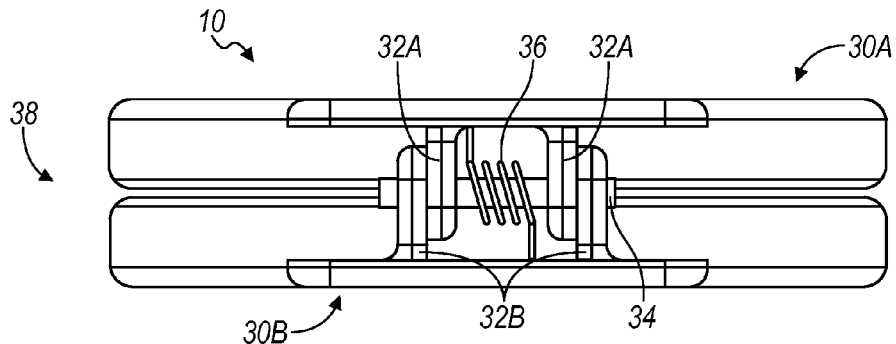
FIG. 3 is a top plan view of an assembly clip according to the present invention.

Referring now to FIGS. 2 and 3, the assembly clip or aide 10 comprises a first portion or holder 30A and a second, generally symmetrical portion or holder 30B. The first portion 30A and the second portion 30B include inwardly directed and overlapping arms or lugs 32A and 32B having aligned holes or apertures which receive a pivot pin 34 and a coil spring 36 configured to provide a biasing force which urges the first and second portions or holders 30A and 30B into the closed position illustrated in FIG. 2. Adjacent the arms or lugs 32A and 32B, the first and second portions or holders 30A and 30B include conveniently manually engageable enlarged ears or handles 36A and 36B which may be forced together or compressed to open the opposite end of the assembly clip 10.

The opposite end of the assembly aide or clip 10 is a curved body 38 which defines a generally semi-circular channel 40, one axial half of which resides in the first portion 30A and another axial half of which resides in the second portion 30B. The inside diameter of the circular channel 40 is preferably the outside diameter of the multi-link chain 20 in place on the chain sprocket 12 which is to be installed with the assembly aide or clip 10. Thus it should be understood that it will be preferable to utilize various sizes, i.e., inside diameters, of the circular channel 40 and thus different sizes of the assembly clip 10 with various chain sprockets and chains in order to best hold these components during the following assembly steps. Each of the first and second portions or holders 30A and 30B also includes opposed pins or lugs 42A and 42B which engage one of the through apertures or openings 18 of the chain sprocket 12. To facilitate disposition of the chain sprocket 12 in the assembly aide or clip 10, the ends of the pins or lugs 42A and 42B may include mirror image chamfers or oblique surfaces 44A and 44B. To facilitate cooperation with another assembly aide illustrated in FIG. 8, regions of the curved body 38 may include cutouts or cutaway portions 46 as will be described in more detail subsequently.

Figure 4:
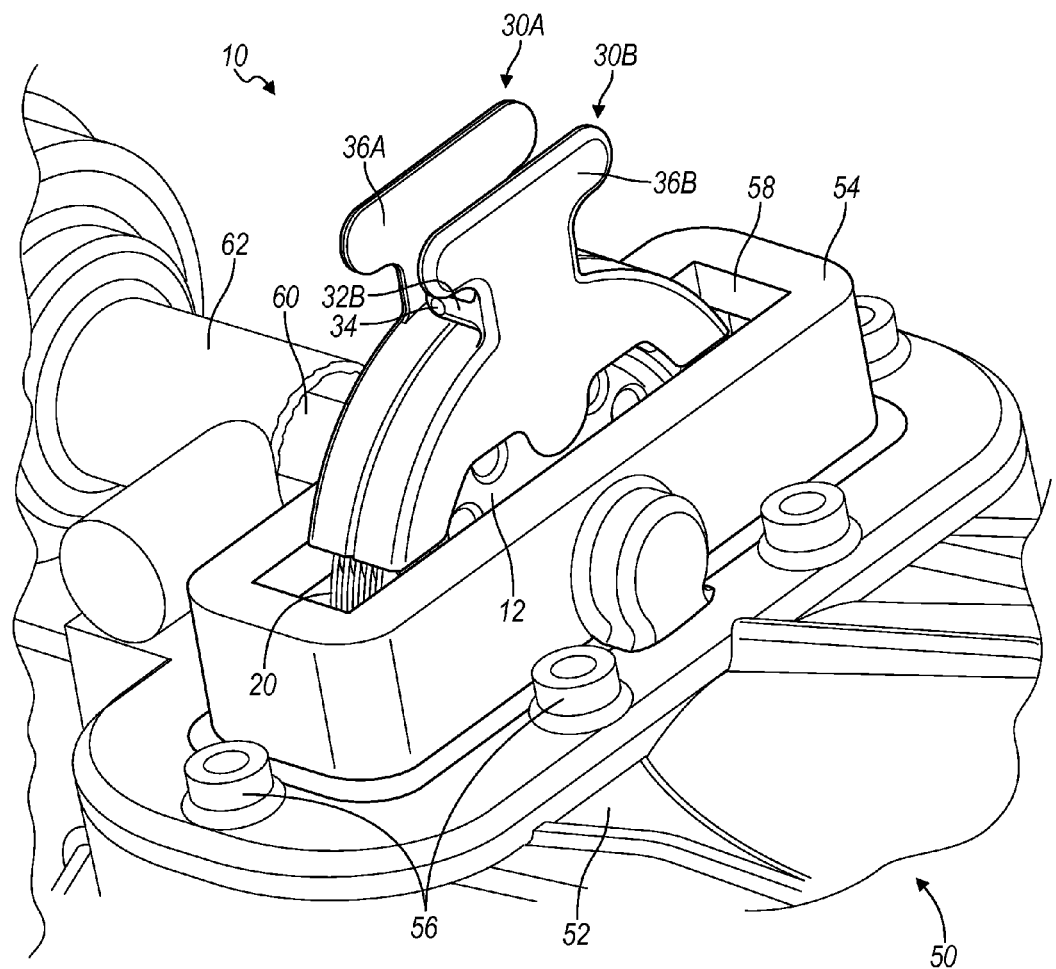
FIG. 4 is a perspective view of the exterior of a motor vehicle automatic transmission during an installation step illustrating the assembly clip, one chain sprocket and a chain according to the present invention.

Referring now to FIG. 4, a portion of an automatic motor vehicle transmission is illustrated and designated by the reference number 50. The automatic transmission 50 includes a cast metal housing 52 which locates, supports and protects the various internal components of the transmission 50. On the outside of the metal transmission housing 52 is a formed, generally rectangular collar or mounting 54 associated with a power take off. The power take off collar or mounting 54 is secured to the transmission 50 by a plurality of threaded fasteners 56. The collar or mounting 54 defines an elongate slot 58 which receives a chain sprocket such as the chain sprocket 12 and includes bearings and other features (not illustrated) which receive and support a power take off shaft 60 residing in an axial tube or housing 62. In FIG. 4, the assembly clip 10 holding the first chain sprocket 12 and the chain 20 (the components illustrated in FIG. 1) have been dropped into the slot of the power take of collar 54.

Figure 5:
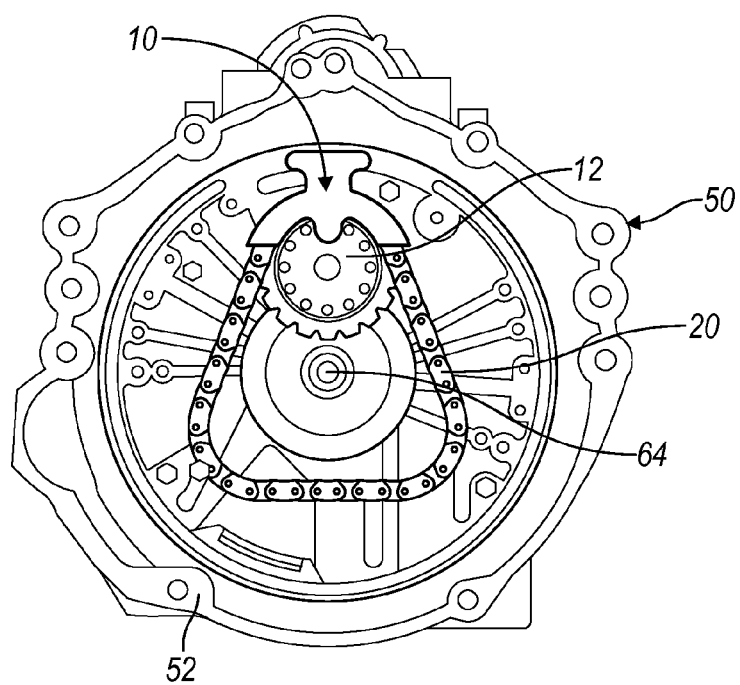
FIG. 5 is an end elevational view of a motor vehicle automatic transmission, the assembly clip, the chain and one chain sprocket disposed in the assembly clip preparatory to a second chain sprocket installation on a transmission shaft according to the present invention.
Figure 6:
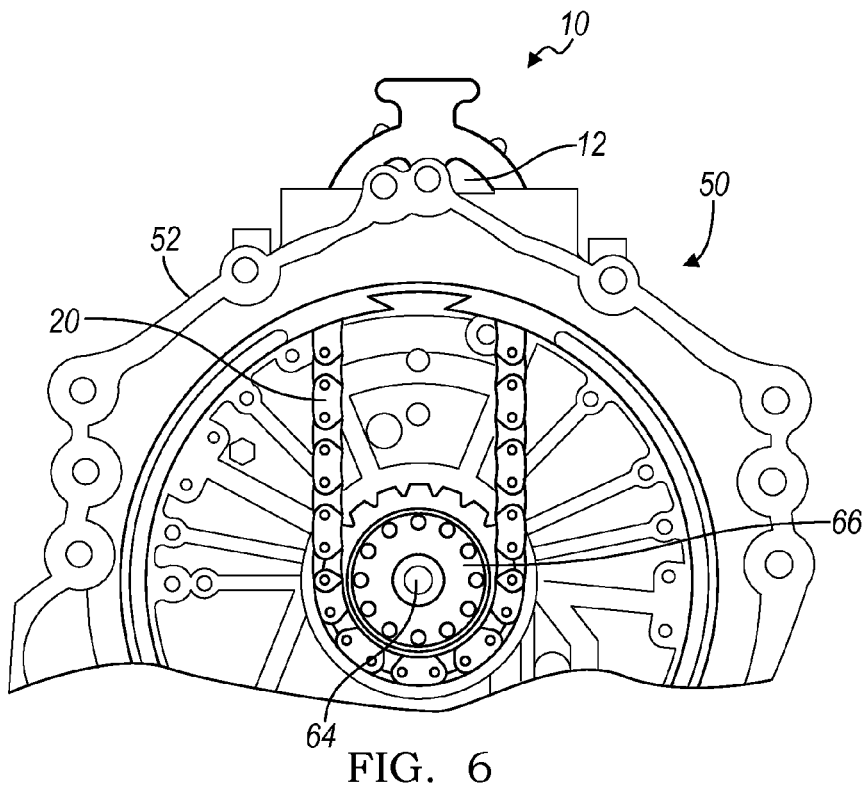
FIG. 6 is an end elevational view of a motor vehicle automatic transmission, the assembly clip, chain, one chain sprocket disposed in the assembly clip and the second chain sprocket secured to the transmission shaft according to the present invention.

Turning then to FIGS. 5 and 6, the automatic transmission 50 includes a center shaft 64 which, among other things, provides torque to the power take off. Thus it is necessary to secure a second chain drive sprocket 66 to the center shaft 64 and engage or dispose the multi-link chain 20 about it. It should be understood that the following assembly steps are most easily accomplished when the power take off collar or mounting 54 is oriented at the top of the transmission 50 and in general vertical alignment with the center shaft 64 of the transmission 50. Since the assembly aide or clip 10 is holding the first sprocket 12 and the chain 20 in generally the position illustrated in FIG. 5, the second chain sprocket 66 may be secured to the center shaft 64 by any suitable means such as interengaging splines, welds or an interference fit. The chain 20 is then disposed about the second sprocket 66 and the assembly aide or clip 10 lifted to retain the multi-link chain 20 about the second chain sprocket 66 as illustrated in FIG. 6.

Figure 7:
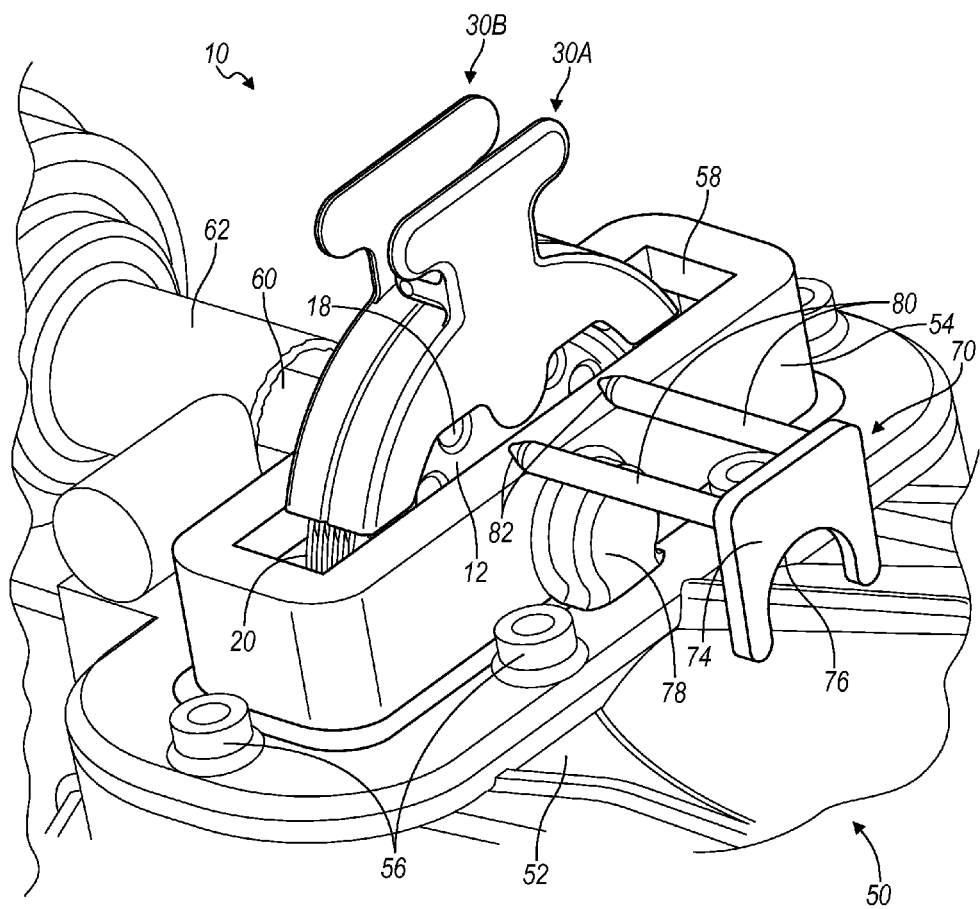
FIG. 7 is a perspective view of the exterior of a motor vehicle automatic transmission illustrating the assembly clip, one chain sprocket and the chain disposed in the assembly clip and a pin tool or holder according to the present invention being installed in the chain sprocket.

Referring now to FIG. 7, after the assembly aide or clip 10 is lifted through the elongate slot 58 in the power take off collar 54, to retain the multi-link chain 20 about the second chain sprocket 66 and the first chain sprocket 12 generally in place in the power take off collar 54, a pin tool or holder 70 is inserted into two of the apertures or openings 18 in the first chain sprocket 12. As noted above, the assembly clip 10 includes axially aligned cutouts or cutaway portions 46 in each of the holders or portions 30A and 30B which facilitate installation of the pin tool or holder 70 into the apertures or openings 18 of the first chain sprocket 12.

Figure 8:
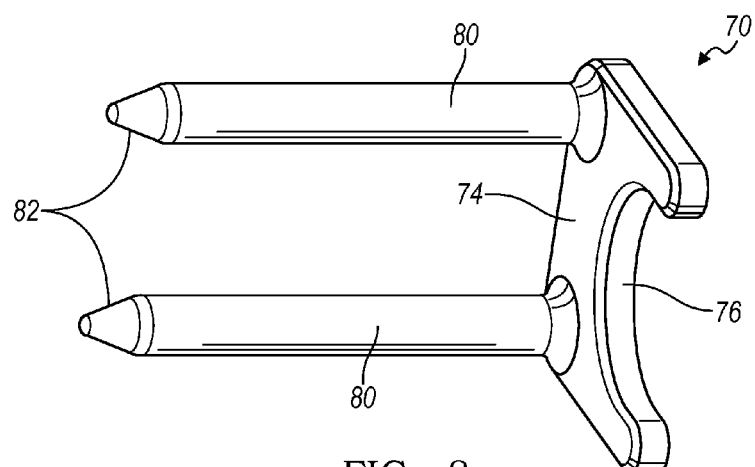
FIG. 8 is a perspective view of the pin tool or holder of FIG. 7 according to the present invention.

Referring now to FIGS. 7 and 8, the pin tool or holder 70 includes a generally rectangular or square base portion 74 which may include a semi-circular cutaway region 76 designed and intended to complement and not interfere with a feature such as a bearing housing 78 on the power take off collar or mounting 54. Accordingly, it should be appreciated that the cutaway region 76 may take many different forms and may be eliminated entirely depending upon the use and application of the pin tool or holder 70. As configured, however, the cutaway region 76 of the pin tool or holder 70 pilots or positions the holder 70 on the bearing housing 78 and thus accurately aligns the first chain sprocket 12 with the bearing within the bearing housing 78 and thus the axis of the power take off shaft 60.

Extending from the base portion 74 of the pin tool or holder 70 are a pair of parallel, spaced apart pins or posts 80 which are spaced a distance equal to the spacing of non-adjacent apertures or openings 18 in the first chain sprocket 12. Preferably, the ends of the pins or posts 80 define conical or frusto-conical surfaces 82 which facilitate insertion of the pins or posts 80 into the apertures or openings 18 of the first chain sprocket 12. When inserted into the apertures or openings 18 of the first chain sprocket 12 and piloted on the bearing housing 78 or other feature of the power take off collar 54, the pin tool or holder 70 locates and retains the first chain sprocket 12 and the chain 20 in a position within the power take off collar or mounting 54 whereby the power take off shaft 60 can be readily installed in the first chain sprocket 12.

As illustrated in FIG. 9, after the pins or posts 80 of the pin tool or holder 70 have been inserted into the apertures or openings 18 of the chain sprocket 12, the assembly aide or clip 10 may be removed. The pin tool or holder 70 alone retains the first chain sprocket 12 and the multi-link chain 20 in position in the power take off collar 54 for all subsequent assembly steps, most importantly, installation and securement of the power take off shaft 60 to the first chain sprocket 12. The pin tool or holder 70 may be readily removed after the first chain sprocket 12 has been secured to the power take off shaft 60.

Referring now to FIG. 10, a final step of the method involves closing the front of the transmission 50 with a bulkhead or front cover 86 which is secured by a plurality of bolts 88. Similarly, the collar or mounting 54 for the power take off may be closed with a cover (not illustrated). Of course, before the the cover is installed, the pin tool or holder 70 is removed from the chain sprocket 12, as noted above.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of installing a chain for a power take off in an automatic transmission, comprising the steps of:
    providing a transmission having a center shaft and a power take off mounting,
    assembling a first chain sprocket and chain in an assembly clip,
    lowering said chain into said transmission through said power take off mounting with said assembly clip,
    securing a second chain sprocket on said center shaft and engaging said second chain sprocket with said chain,
    lifting said first chain sprocket and said chain with said assembly clip into said power take off mounting,
    retaining said first chain sprocket and chain in said power take off mounting by installing a pin tool in said first chain sprocket.

2. The method of claim 1 further including the step of installing a power take off shaft in said first chain sprocket.

3. The method of claim 1 further including the step of installing a cover in said transmission over said second chain sprocket and said chain.

4. The method of claim 1 further including the step of orienting said power take off mounting at substantially a top of said transmission.

5. The method of claim 1 further including the step of piloting said pin tool on a feature of said power take off mounting.

6. The method of claim 5 wherein said feature of said power take off mounting is a bearing housing.

7. A method of installing a chain for a power take off of an automatic transmission, comprising the steps of:
    providing a transmission having a center shaft and a power take off collar defining an opening,
    assembling a first chain sprocket and chain in an assembly clip,
    lowering said chain into said transmission through said opening in said power take off collar with said assembly clip,
    securing a second chain sprocket to said center shaft of said transmission and engaging said second chain sprocket with said chain,
    lifting said first chain sprocket and said chain with said assembly clip into said opening in said power take off collar,
    retaining said first chain sprocket and chain in said opening of said power take off collar by installing a pin tool in said first chain sprocket.

8. The method of claim 7 further including the steps of providing a power take off shaft and securing said first chain sprocket to said power take off shaft.

9. The method of claim 7 further including the steps of providing a cover and installing said cover in said transmission over said second chain sprocket and said chain.

10. The method of claim 7 further including the step of orienting said transmission with said opening in said power take off collar directed substantially upwardly.

11. The method of claim 7 further including the step of piloting said pin tool on a feature of said power take off collar.

12. The method of claim 11 wherein said feature of said power take off collar is a bearing housing.

\* \* \* \* \*